(12) United States Patent
Shanholtz et al.

(10) Patent No.: US 9,692,465 B1
(45) Date of Patent: Jun. 27, 2017

(54) AGGREGATE INTERFERENCE MODEL AND USE THEREOF TO EVALUATE PERFORMANCE OF A RECEIVER

(71) Applicant: Exelis Inc., Herndon, VA (US)

(72) Inventors: Thomas Lee Shanholtz, Chester, MD (US); Michael L. Davis, Davidsonville, MD (US); Michael L. Haberman, Gambrills, MD (US)

(73) Assignee: Eagle Technology, LLC, Wilmington, DE (US)

( * ) Notice: Subject to any disclaimer, the term of this patent is extended or adjusted under 35 U.S.C. 154(b) by 85 days.

(21) Appl. No.: 14/850,461

(22) Filed: Sep. 10, 2015

(51) Int. Cl.
*H04B 1/10* (2006.01)
*H04W 24/10* (2009.01)

(52) U.S. Cl.
CPC ........... *H04B 1/1027* (2013.01); *H04B 1/109* (2013.01); *H04W 24/10* (2013.01)

(58) Field of Classification Search
CPC ...... H04B 1/1027; H04B 1/109; H04W 24/10
See application file for complete search history.

(56) References Cited

U.S. PATENT DOCUMENTS

| | | | | |
|---|---|---|---|---|
| 8,488,578 B1* | 7/2013 | Fuemmeler | ........ | H04B 1/70735 370/341 |
| 2005/0159165 A1* | 7/2005 | Argyropoulos | ..... | H04L 12/5695 455/452.2 |
| 2006/0262842 A1* | 11/2006 | Pal | ........ | G06K 9/6242 375/233 |
| 2009/0103568 A1* | 4/2009 | Garba | ..... | H04J 13/00 370/479 |
| 2015/0063207 A1* | 3/2015 | Nakamura | ............ | H03M 13/13 370/328 |
| 2016/0006499 A1* | 1/2016 | Jeong | ................. | H04B 7/18523 455/12.1 |
| 2016/0063390 A1* | 3/2016 | Mytkowicz | ............ | G06N 7/005 706/52 |

* cited by examiner

*Primary Examiner* — Jae Y Lee
(74) *Attorney, Agent, or Firm* — Edell, Shapiro & Finnan LLC

(57) ABSTRACT

A computer implemented hybrid method determines a modeled aggregate interference power distribution at a receiver resulting from multiple radio frequency (RF) interferers. The method determines a respective interference power distribution for each interferer. The method also determines, among the interference power distributions, (i) first interference power distributions that meet a Central Limit Theorem (CLT) criterion, and (ii) second interference power distributions that do not meet the CLT criterion. The method combines the first interference power distributions using the CLT to produce the normal combined interference power distribution, and convolves the second interference power distributions with each other and the normal combined interference power distribution to produce the aggregate interference power distribution.

22 Claims, 8 Drawing Sheets

EIRP DISTRIBUTION VALUES
300

| UE EIRP (dBm) | URBAN/SUBURBAN (1.732 Km INTER-SITE DISTANCE (ISD)) | | RURAL (7 Km ISD) | |
|---|---|---|---|---|
| | PDF | CDF | PDF | CDF |
| -40 | 0 | 0 | 0 | 0 |
| -37 | 0.0001 | 0.0001 | 0 | 0 |
| -34 | 0.0002 | 0.0003 | 0 | 0 |
| -31 | 0.0008 | 0.0011 | 0 | 0 |
| -28 | 0.002 | 0.0031 | 0 | 0 |
| -25 | 0.004 | 0.0071 | 0 | 0 |
| -22 | 0.0083 | 0.0154 | 0.0002 | 0.0002 |
| -19 | 0.0166 | 0.032 | 0.0004 | 0.0006 |
| -16 | 0.0327 | 0.0647 | 0.0007 | 0.0013 |
| -13 | 0.0547 | 0.1194 | 0.0026 | 0.0039 |
| -10 | 0.0839 | 0.2033 | 0.006 | 0.0099 |
| -7 | 0.1128 | 0.316 | 0.0153 | 0.0252 |
| -4 | 0.137 | 0.453 | 0.0325 | 0.0577 |
| -1 | 0.1429 | 0.5959 | 0.0575 | 0.1152 |
| 2 | 0.1338 | 0.7297 | 0.0911 | 0.2062 |
| 5 | 0.1094 | 0.839 | 0.1245 | 0.3307 |
| 8 | 0.0753 | 0.9143 | 0.1536 | 0.4843 |
| 11 | 0.045 | 0.9594 | 0.1605 | 0.6448 |
| 14 | 0.0236 | 0.983 | 0.1473 | 0.792 |
| 17 | 0.0106 | 0.9936 | 0.1203 | 0.9123 |
| 20 | 0.0064 | 1 | 0.0877 | 1 |

FIG.3

AGGREGATE INTERFERENCE MODEL AND USE THEREOF TO EVALUATE PERFORMANCE OF A RECEIVER

GOVERNMENT LICENSE RIGHTS

This invention was made with government support under Contract No. HC1047-07-D-0001. The government has certain rights in the invention.

BACKGROUND

The proliferation of wireless devices such as mobile phones, Wi-Fi capable devices, and video signals has increased the demand for wireless broadband access to the electromagnetic (EM) spectrum. Accordingly, U.S. Government agencies have been directed to share previously used spectrum bands with wireless broadband devices, and have also begun various impact analyses to assess levels of interference that the wireless devices will introduce into the spectrum. The wireless industry has provided transmit power probability distributions for the wireless devices as a starting point for interference analyses; however, accurately determining aggregate interference from the wireless devices is complicated by their potentially large numbers and the fact that they implement power control algorithms that cause their transmit powers to vary over wide dynamic ranges. For example, interfering wireless devices may number in the thousands and their transmit powers may range between 10 microwatts and 100 milliwatts. One technique to calculate aggregate interference power from many wireless devices with varying transmit powers uses a Monte Carlo simulation. The Monte Carlo simulation is computationally intensive and requires a relatively large amount of time, e.g., many hours or even days, to complete. Also, the aggregate interference power produced by the Monte Carlo simulation may lack accuracy.

SUMMARY

In an embodiment, a computationally efficient computer implemented hybrid method determines a modeled aggregate interference power distribution at a receiver resulting from multiple radio frequency (RF) interferers spaced from the receiver. The method determines a respective interference power distribution at the receiver for each interferer. The method also determines, among the interference power distributions, (i) first interference power distributions that meet a Central Limit Theorem (CLT) criterion, and (ii) second interference power distributions that do not meet the CLT criterion and. The method combines the first interference power distributions using the CLT to produce the normal combined interference power distribution, and convolves the second interference power distributions with each other and the normal combined interference power distribution to produce the aggregate interference power distribution.

In another embodiment, a receiver includes an antenna, a radio frequency (RF) receiver coupled to the antenna, and a controller coupled to the RF receiver. The controller implements a computer model to determine a modeled aggregate interference power distribution resulting from multiple interferers. The controller also receives signals indicative of actual RF signals captured by the antenna, determines an actual aggregate signal power distribution of the actual RF signals, and compares the actual aggregate signal power distribution to the modeled aggregated interference power distribution. The processor adjusts signal processing parameters in the RF receiver responsive to results of the compare.

BRIEF DESCRIPTION OF THE DRAWINGS

FIG. 3 is a table of numerical values for an urban Cumulative Distribution Function (CDF) and a rural CDF from FIG. 2, and numerical values for a respective probability density function (PDF) corresponding to each CDF.

DETAILED DESCRIPTION

1. Interference Environment

Figure 1:
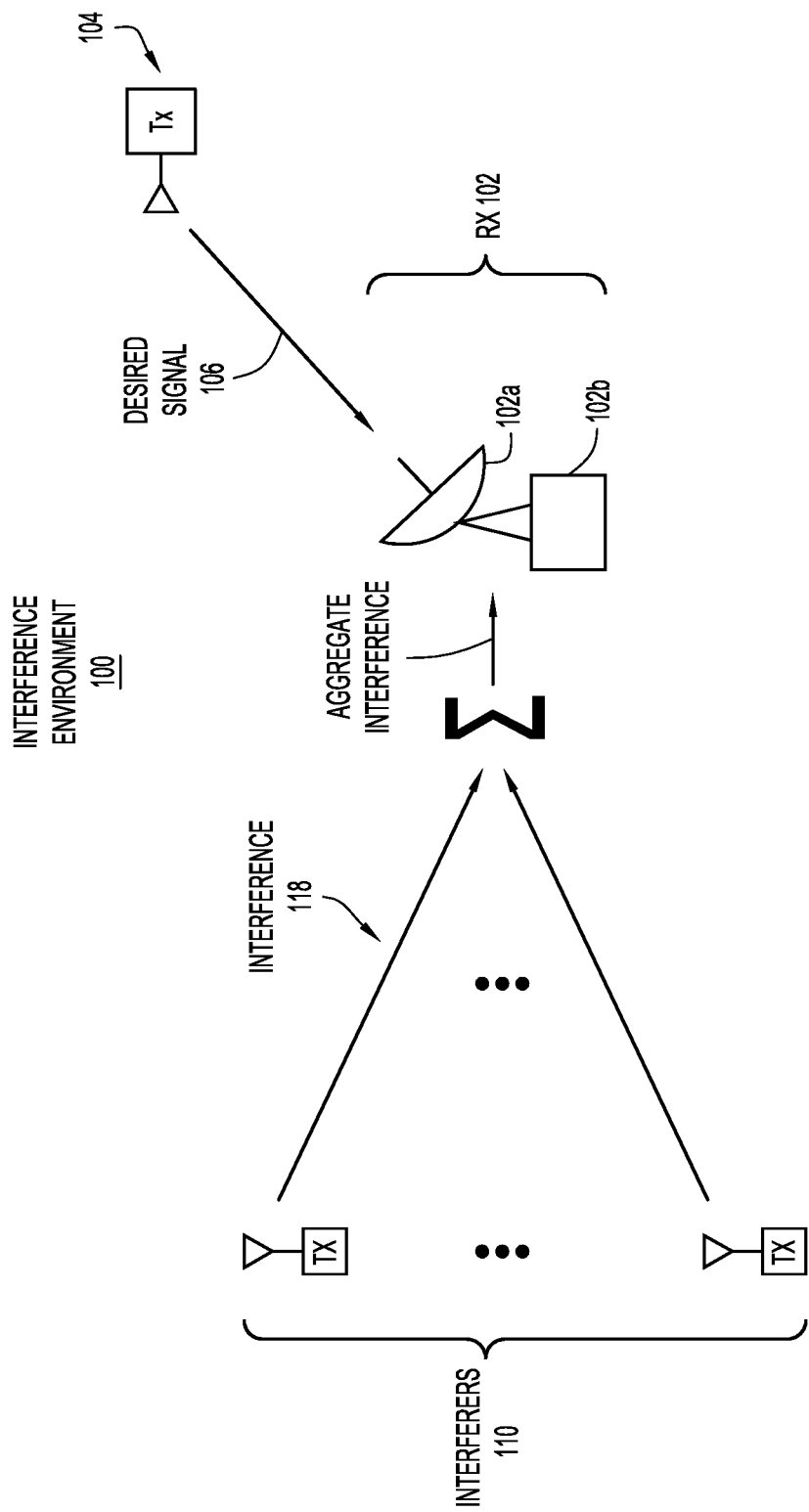
FIG. 1 is a block diagram of an example interference environment for a receiver that may be modeled or simulated as an aggregate interference model.

With reference to FIG. 1, there is a block diagram of an example interference environment 100 for a receiver that may be modeled or simulated as an aggregate interference model according to embodiments presented herein. Environment 100 includes a receiver (RX) 102 and a "friendly" transmitter (TX) 104 that receive and transmit in a same frequency band, respectively. Examples frequency bands include 1695-1710 MHz or 1755-1780 MHz, although other frequency bands may be used. Receiver 102 includes a receive antenna 102a coupled to a receiver subsystem 102b. In an embodiment, antenna 102a may be a directional antenna having a main antenna beam pointed toward friendly transmitter 104, i.e., a central axis of the main antenna beam is aligned with the position of friendly transmitter 104. Antenna 102a may also be an omni-directional antenna, or a directional tracking type antenna. Antenna 102a captures a desired signal 106 transmitted in the frequency band by friendly transmitter 104 and delivers the captured signal to receiver subsystem 102b. Receiver subsystem 102b processes/detects the delivered signal.

Environment 100 also includes multiple interferers 110 geographically spaced-apart from receiver 102 and that serve as sources of interference that interfere with desired signal 106 at the receiver. Interferers 110 may include different types of wireless devices, such as cell phones and Wi-Fi capable devices, including personal computers, and interferers 110 may inter-operate with local base-stations in environment 100. Environment 100 may include many thousands of interferers 110

Interferers 110 typically include omni-directional antennas that transmit/radiate interference signals 118 concurrently and in the same band as desired signal 106 toward receiver 102. Interference signals 118 typically have wide dynamic ranges. Collectively, interference signals 118 contribute to a total or aggregate interference captured by antenna 102(a). The aggregate interference degrades an ability of receiver subsystem 102b to optimally detect desired signal 106 relative to when receiver 102 operates in the absence of such aggregated interference.

An embodiment herein is directed to a computer implemented model or simulation of interference environment 100 that realistically represents interference experienced at receiver 102 over a spatial region in which the receiver and interferers 110 operate. The computer implemented model is referred to as the "aggregate interference model." The aggregate interference model simulates/models wide dynamic range interference from many interferers 110 and quantifies a power of the aggregate interference (i.e., an "aggregate interference power") at receiver 102 that results from the simulated interference, as described below. Another embodiment incorporates the aggregate interference model into an actual receiver or spectrum monitor to validate performance of the receiver/spectrum monitor with respect to actual interference received by the receiver/spectrum monitor. In each embodiment, the aggregate interference model combines a Central Limit Theorem method with convolution to determine the aggregate interference so as to substantially reduce the computational complexity and time needed to aggregate the interference, and also produce an accurate result compared to conventional modeling techniques used to aggregate interference.

2. Aggregate Interference Power Equation

The above-mentioned aggregate interference power is a sum of interference powers from N interferers 110 evaluated at receiver 102. The aggregate interference power is given by:

$$i_{aggregate} = \sum_{k=1}^{N} 10^{\frac{i_K}{10}}, \quad \text{Equation 1}$$

where $i_{aggregate}$=total interference power (i.e., aggregate interference power) at receiver 102, mW, and $i_k$=Interference power from interferer k (i.e., a given one of interferers 110) at receiver 102, dBm.

As will be described below, calculation of the interference power $i_k$ from interferer k is based on an assumed Effective Isotropic Radiated Power (EIRP) of the interferer. The EIRP is assumed to be a random variable. Because aggregate interference power $i_{aggregate}$ is based on a sum of random variables (i.e., EIRPs), aggregate interference power $i_{aggregate}$ is also a random variable. The details of individual interference power $i_k$ are now described. Then, methods used to sum or aggregate individual interference powers (i.e., to sum random variables) to obtain the aggregate interference power $i_{aggregate}$ is described.

Interference power $i_k$ at receiver 102 from interferer k is given by the following equation:

$$i_k = EIRP - L_p + G_r(\theta,\phi) - L_{pol} - L_s - FDR(\Delta f) \quad \text{Equation 2,}$$

where:

EIRP=Interferer effective isotropic radiated power, dBm.
$L_p$=Interference path propagation loss, dB.
$G_r(\theta, \phi)$=Receiver antenna gain in the direction of the interferer, dB.
$L_{pol}$=Antenna polarization mismatch loss, dB.
$L_s$=Receiver system loss, dB.
FDR($\Delta f$)=Frequency Dependent Rejection.

In Equation 2, interference power $i_k$, EIRP is assumed to be a random variable. The EIRP is defined according to a probability mass function (PMF), or as a cumulative distribution function (CDF). The CDF assigns probabilities to corresponding EIRP values across a range of EIRP values, such that a probability that a given EIRP will occur can be determined from the CDF. The antenna of each interferer k is assumed to be omni-directional and therefore the EIRP radiated by the interferer is assumed to be the same in all directions. The EIRP for interferer k is characterized as a random variable to reflect the variation of the EIRP as the result of power control algorithms assigned to interferer k by a wireless service provider's network that is designed to maximize data throughput.

Figure 2:
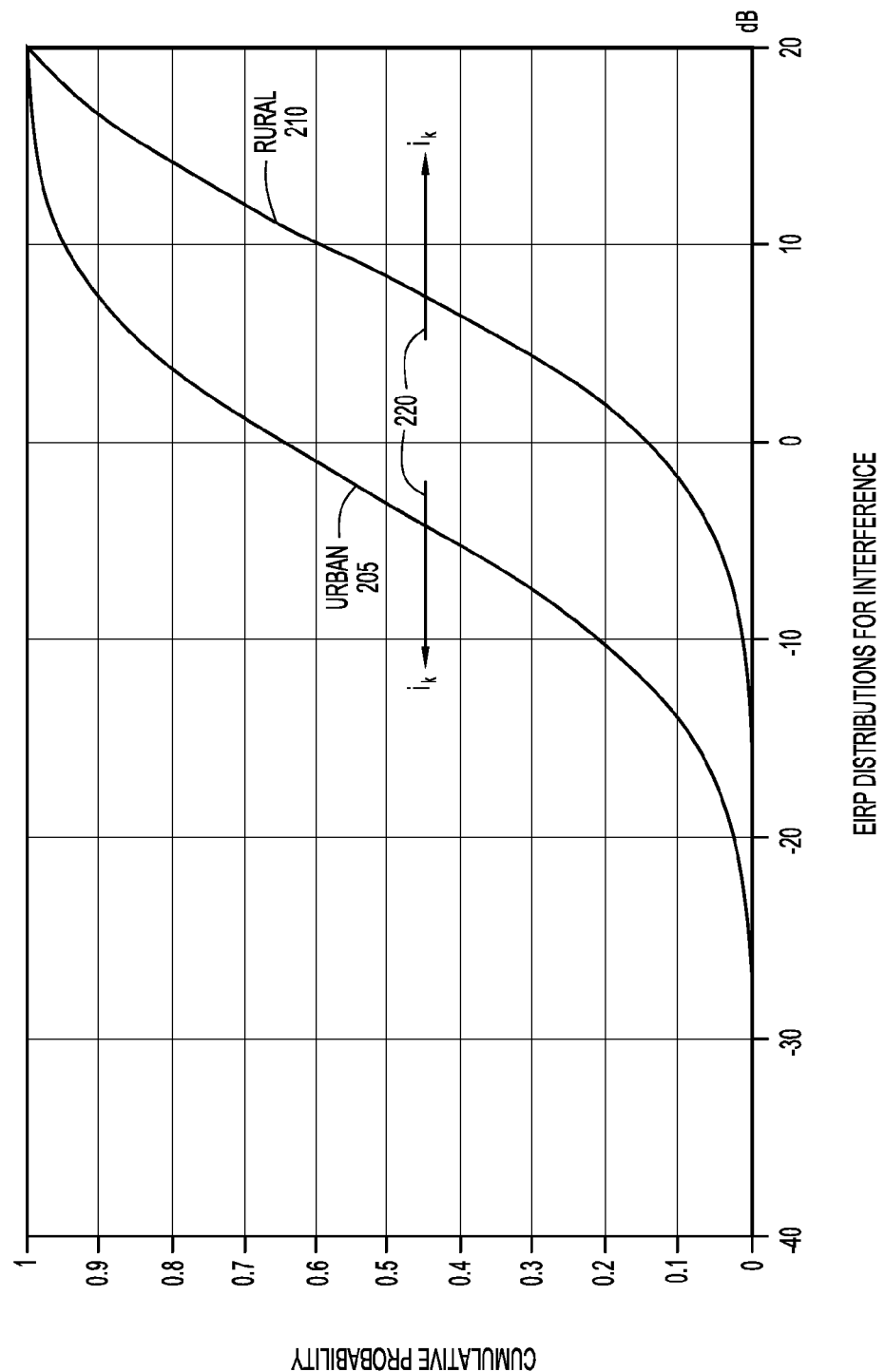
FIG. 2 shows illustrations of example Effective Isotropically Radiated Power (EIRP) probability distributions for an interferer.

With reference to FIG. 2, there are illustrations of example EIRP probability distributions for interferer k. The EIRP probability distributions are represented as CDFs. FIG. 2 shows an urban CDF 205 for the EIRP of interferer k operating with a base station sector located in an urban area, and a rural CDF 210 for the EIRP of interferer k operating with a base station sector located in a rural area. The difference between the urban and rural CDFs 205 and 210 reflects generally longer path lengths and required higher EIRP for interferers operating in larger sectors of base stations serving rural areas. CDFs 205 and 210 are generated based on actual measurements of EIRP from many wireless devices/interferers over time and represent the probabilities that each interferer will transmit an EIRP With reference to FIG. 3, there is shown a table 300 of numerical values for urban CDF 205 and rural CDF 210 from FIG. 2, and numerical values for a respective probability mass function (PMF) corresponding to each CDF.

As shown in Equation 2 above, the interference power $i_k$ from interferer k is based on the EIRP of interferer k. Analysis herein assumes that interference power $i_k$ is a scaled version of EIRP CDF 205 or 210. More specifically, interference power $i_k$ is represented as EIRP CDF 205 or 210 scaled by the other parameters in Equation 2, i.e., the parameters $L_p$, $G_r(\theta, \phi)$, $L_{pol}$, $L_s$ and FDR($\Delta f$). In one embodiment, the parameters shift EIRP CDF 205 or 210 left or right by X dB as shown by arrows 220 in FIG. 2, to produce the interference power $i_k$. It follows that interference power $i_k$ is an interference power distribution for interferer k and is therefore also referred to herein as "interference power distribution $i_k$."

The aggregate interference model assigns respective values to the model parameters $L_p$, $G_r(\theta, \phi)$, $L_{pol}$, $L_s$ and FDR($\Delta f$) for each interferer k according to various techniques, so that the interference power distributions vary (i.e., are shifted left or right in FIG. 2 by varying amounts) across the different interferers. For $L_{pol}$ $L_s$, and FDR, the values will be the same for each interferer $L_p$ and $G_r(\theta, \phi)$ will vary depending upon the location of the interferer relative to the receiver. For each parameter, a value may be randomly selected from a predetermine range of values (e.g., in dB) for that parameter, such that value of the parameter varies across the interferers. Alternatively, a value may be selected based on a predetermined probability distribution function of values for the given parameter, so that the parameter varies across the interferers. Other techniques for selecting values for parameters may be used.

In Equation 2, interference path propagation loss $L_p$ represents the propagation path loss, e.g., free space path loss, experienced by the EIRP due to the separation distance between interferer k and receiver 102.

Assuming antenna 102a of receiver 102 is a directional antenna having its main antenna beam pointing at/aligned with friendly transmitter 104, antenna gain Gr($\theta$, $\phi$) is the gain of the antenna in the direction of interferer k, which represents the off-axis gain of the antenna in the direction of the interferer, i.e., the gain of the antenna at an angle (defined by azimuth $\theta$ and elevation $\phi$) from the central axis of the main antenna beam. Antenna polarization mismatch loss $L_{pol}$ is the loss due to differences in the polarizations of antenna 102a and the antenna of interferer k.

Frequency Dependent Rejection FDR($\Delta$f) is based on an emission spectra for interferer k, a receiver selectivity of receiver subsystem 102b, and the difference in frequency between a center transmit frequency of the emission spectra for interfere k and a listening frequency assigned to receiver subsystem 102b.

3. Interference Power Aggregation

As shown in Equation 1, the aggregate interference power $i_{aggregate}$ is the sum of interference power from N interferers. As mentioned above, the interference power $i_k$ from each interferer k is a random variable expressed as an interference power distribution and therefore the aggregate interference power $i_{aggregate}$ is also a random variable expressed as an aggregate interference power distribution. Computing the distribution for the sum of many (potentially thousands) of random variables is a numerically complex and intensive problem if done using numerical convolution. Thus, embodiments herein provide a computationally efficient and accurate hybrid approach to compute the sum that combines both numerical convolution with a method based on the Central Limit Theorem (CLT) (i.e., a CLT method).

Interference Power Aggregation Using Numerical Convolution

Probability theory states that the discrete PMF of the sum of two independent random variables can be obtained by numerically convolving the probability density distributions of the two random variables. Thus, to aggregate interference power distributions from multiple, N, interferers, for each interferer k, numerically convolve the interference power distribution for that interferer (e.g., interference power distribution $i_k$ represented as a scaled version of CDF 205 or CDF 210) with the distribution of the sum of the previously convolved interference power distributions. Each interference power distribution may be represented as a set of discrete points or samples using a histogram, which are numerically convolved with the histograms representing the other interference power distributions. Since convolution is associative, the aforementioned convolution of interference power distributions can be applied sequentially to the sum of any number of random variables, which in this case, represents the aggregate interference power distribution into receiver 102. Numerical convolution advantageously produces an accurate aggregate interference power distribution, but disadvantageously becomes extremely computationally intensive as the number, N, of interference power distributions and the number of points per distribution increase.

Interference Power Aggregation Based on the Central Limit Theorem (CLT)

The CLT states that the distribution of the sum of a sufficiently large enough number of random variables approaches a normal (i.e., Gaussian) distribution, with a mean and variance equal to the sums of the means and variances of the component random variables, respectively. The CLT assumes that the random variables making up the sum are independently distributed and that the variance of any given random variable in the sum is small relative to the sum of the variances, so that no one of the random variables dominates the sum. Thus, a CLT method to aggregate interference power distributions (from multiple interferers) that meet the aforementioned criteria of the CLT, sums the means and the variances of the individual interference power distributions into a summed (or combined) mean and a summed (or combined) variance, such that the summed mean and the summed variance completely define or describe a normal aggregate interference power distribution that represents the sum of the individual interference power distributions. The CLT method advantageously produces an accurate aggregate interference power distribution for the individual interference power distributions that meet the CLT criteria. Also, the CLT method has a relatively low computational complexity compared to numerical convolution because computing individual means and variances and then summing them in the CLT method is relatively simple compared to numerically convolving many sampled distributions.

Hybrid Interference Power Aggregation Using Both the CLT Method and Convolution

To aggregate multiple interference power distributions, a hybrid method uses the CLT method to aggregate those interference power distributions among the multiple interference power distributions that meet the CLT criteria and numerical convolution to aggregate the other interference power distributions that do not meet the CLT criteria, as described below in connection with FIG. 4.

Figure 4:
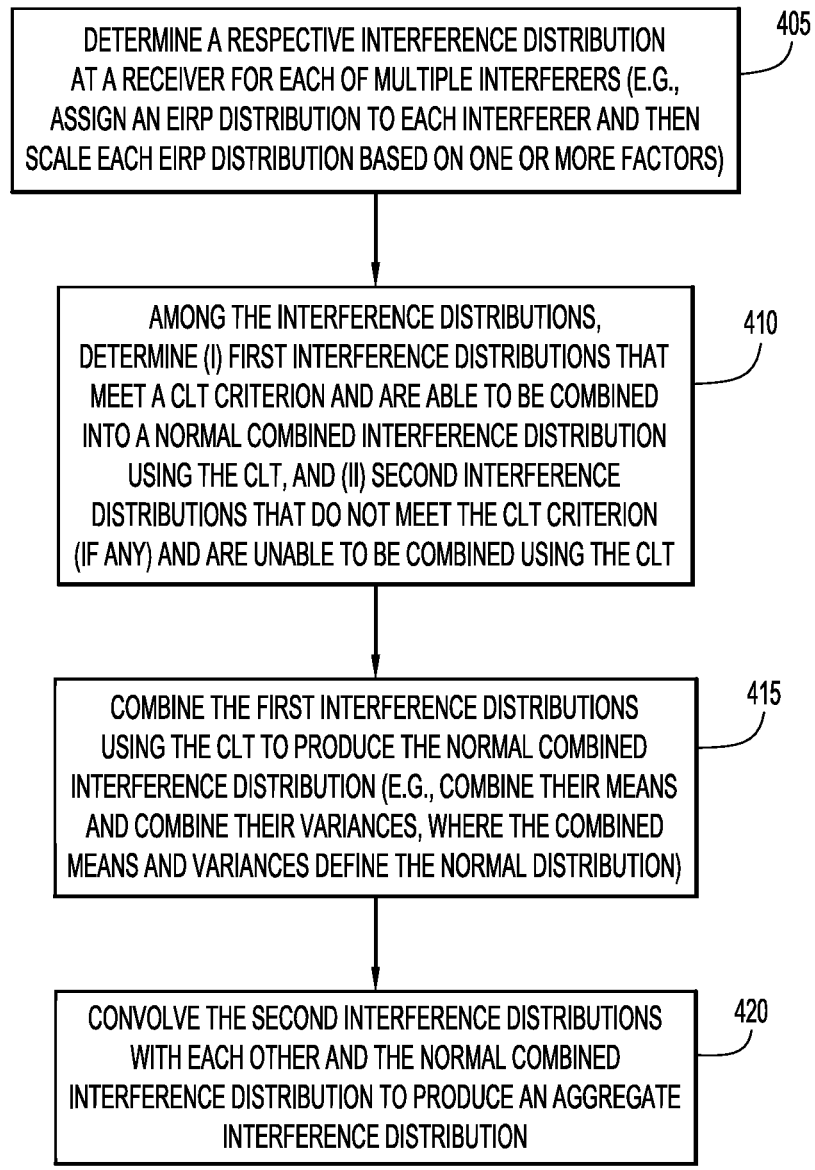
FIG. 4 is a flowchart of a computationally efficient computer implemented hybrid method of determining an aggregate interference power distribution at a receiver resulting from multiple interference power distributions, using both a Central Limit Theorem method and convolution.

With reference to FIG. 4, there is a flowchart of a computationally efficient computer implemented hybrid method 400 of determining an aggregate interference power distribution at receiver 102 resulting from multiple interference power distributions originating from multiple originating interferers 110 that are spaced-apart from the receiver. Method 400 is referred to as "hybrid" because it uses both a CLT method and convolution. Method 400 is performed by a computer also referred to as "a controller." An example computer/controller to perform methods presented herein is described below in connection with FIG. 6.

At 405, the controller determines a respective interference power distribution $i_k$ at receiver 102 for each interferer k. To do this, the controller assigns a respective EIRP distribution (e.g., a predetermined CDF) to each interferer k and scales the EIRP distribution based on one or more of the parameters of Equation 2, described above.

At 410, the controller determines, among the multiple interference power distributions, (i) first interference power distributions that meet at least one CLT criterion (i.e., a criterion related to the CLT) and are thus able to be combined/summed into a normal (i.e., Gaussian) combined interference power distribution using The CLT, and (ii) second interference power distributions that do not meet the CLT criterion and are thus unable to be combined with the first power distributions to produce the normal combined interference power distribution using the CLT. To do this, in an embodiment, the controller determines a variance of each of the multiple interference power distributions (and also a corresponding mean of each of the multiple interference power distributions), and determines the first interference power distributions using an iterative process, such that no one of the first interference power distributions has a variance that is greater than or equal to a predetermined fraction of a sum of the variances of the first interference power distributions. In other words, all of the first power distributions have variances that are less than the predetermine fraction of the sum of the variances, which is the at least one CLT criterion in one embodiment. In an example, the fraction is substantially less than 1. For example, the fraction may be 10%, although other fractions less than 1 may be used.

At 415, the controller combines the first interference power distributions using the CLT to produce the normal combined interference power distribution. To do this, in an embodiment, the controller sums the means of the first interference power distributions into a combined/summed mean and sums the variances of the first interference power distributions into a combined/summed variance. The combined mean and the combined variance together completely define the normal combined interference power distribution according to the CLT.

At 420, the controller convolves the second interference power distributions with each other and the normal combined interference power distribution from 415 to produce the aggregate interference power distribution. To do this, in an embodiment, the controller generates samples of the normal combined interference power distribution based on the combined variance and the combined mean thereof, and generates samples of each of the second interference power distributions. The samples may include histograms based on CDFs of the various interference power distributions. The controller numerically convolves the samples of the interference power distributions.

Figure 5:
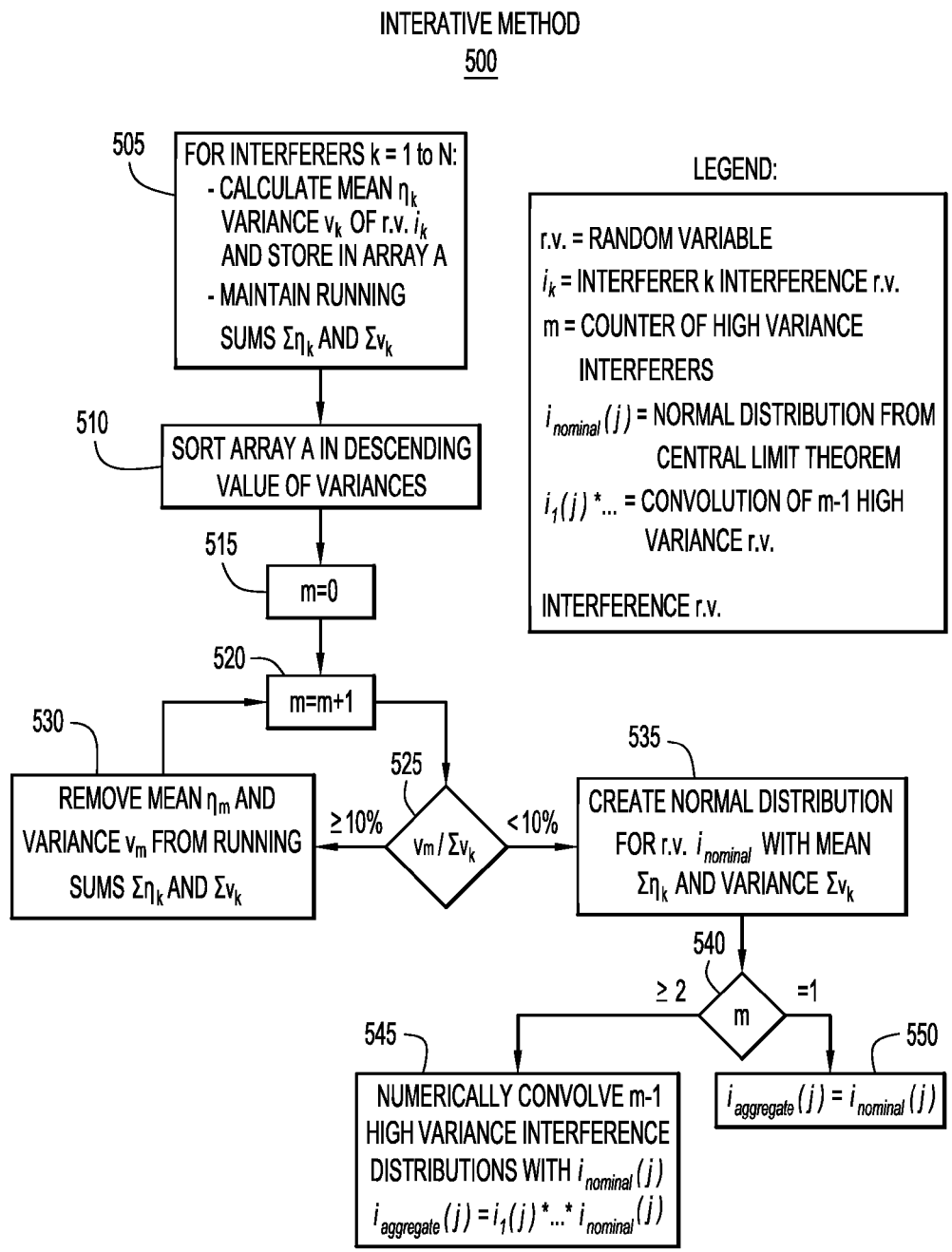
FIG. 5 is a flowchart of an example iterative method of determining first and second interference power distributions introduced in the method of FIG. 4 based on a CLT criterion, and then determining the aggregate interference power distribution.

With reference to FIG. 5, there is a flowchart of an example iterative method 500 of determining the first and second interference power distributions of method 400 based on a CLT criterion, and then determining the aggregate interference power distribution. Method 500 expands on various operations of method 400. Method 500 assumes multiple, N, interferers 110 that originate N respective interference power distributions that are to be aggregated at receiver 102.

At 505, for each interferer k, where k=1 ... N, calculate a mean $\eta_k$ and a variance $v_k$ of random variable (r.v.) $i_k$ (i.e., the respective interference power distribution $i_k$ for interferer k), and store the means and variances in respective entries of an array A. Also compute the summed mean $\Sigma\eta_k$ and the summed variance $\Sigma v_k$, which are "running" sums because they will be updated iteratively in method 500.

At 510, sort the entries of Array A in an order of descending value of the variances therein.

At 515, initialize a counter m of high variance interferers to 0.

At 520, increment counter m by 1.

At 525, determine whether all of the variances in Array A meet a CLT criterion. To do this, in an embodiment, determine if a greatest variance in Array A (i.e., the variance at the top of the sorted Array) is greater than or equal to a fraction (e.g., 10%) of the sum of the variances $\Sigma v_k$ (referred to as a CLT criterion threshold). If yes, then not all of the variances in Array A meet the CLT criterion (i.e., all of the variances in Array A do not meet the CLT criterion) and flow proceeds to 530 to perform an iteration. If no, then all of the variances in Array A meet the CLT criterion and flow proceeds to 535 to perform aggregation.

At 530, because variance $v_m$ (the top variance) does not meet the CLT criterion tested at 525, the top variance $v_m$ and corresponding mean $\eta_m$ are removed (and thus subtracted) from running sums $\Sigma v_k$ and $\Sigma\eta_k$, respectively, which thus reduces the sums to "next" sum values. Flow returns to 520 to repeat 520, 525, and 530 with the next sum values until the greatest variance among the variances remaining in Array A (and thus all of the other lesser variances in Array A) meets the CLT criterion, i.e., until the greatest variance is less than the fraction of the sum of the variances $\Sigma v_k$, in which case flow proceeds to 535. At 535, the variances remaining in Array A are all less than the CLT criterion threshold, i.e., no one variance in Array A is greater than or equal to the CLT criterion threshold. Thus, the variances remaining in Array A correspond to the "first interference power distributions" of method 400 that meet the CLT criterion and are able to be combined into a normal distribution using the CLT, while the top variances that were removed in the iterations correspond to the "second interference power distributions" that do not meet the CLT criterion and thus are not able to be combined using the CLT.

At 535, create a normal interference power distribution $i_{normal}$ based on remaining summed means $\Sigma\eta_k$ and remaining summed variances $\Sigma v_k$.

At 540, determine whether any variances were removed at 530 in the iterations, i.e., whether m is greater than 1. If yes, proceed to 545 to perform as many numerical convolutions as are necessary to incorporate distributions corresponding to all of the removed variances. If no, proceed to 550.

At 545, numerically convolve the m−1 removed top/high variance interference power distributions with each other and the normal combined interference power distribution $i_{normal}$ to produce the aggregate interference power distribution $i_{aggregate}$.

At 550, no numerical convolution is necessary, so the aggregate interference power distribution $i_{aggregate}$ is set equal to the normal interference power distribution $i_{normal}$.

Summarizing method 500, the mean and variance of the interference power distribution from each interferer at receiver 102 are calculated together with a running sum of the means and variances. Variances of the interference power distributions are then sorted in a list by descending value of variance, and large variances (and corresponding means) are removed from the top of the list until the largest variance at the top of the list is less than 10% of the sum of all of the variances remaining in the list. A normal interference power distribution is generated based on the remaining variances and means (i.e., for the remaining interference power distributions based on their remaining variances and means) using the Central Limit Theorem. The (final) aggregate interference power distribution is calculated using numerical convolution of the interference power distributions of the interferers that were removed from the sorted list because of their large variances, which is followed by a convolution with the normal distribution.

4. Computer

Figure 6:
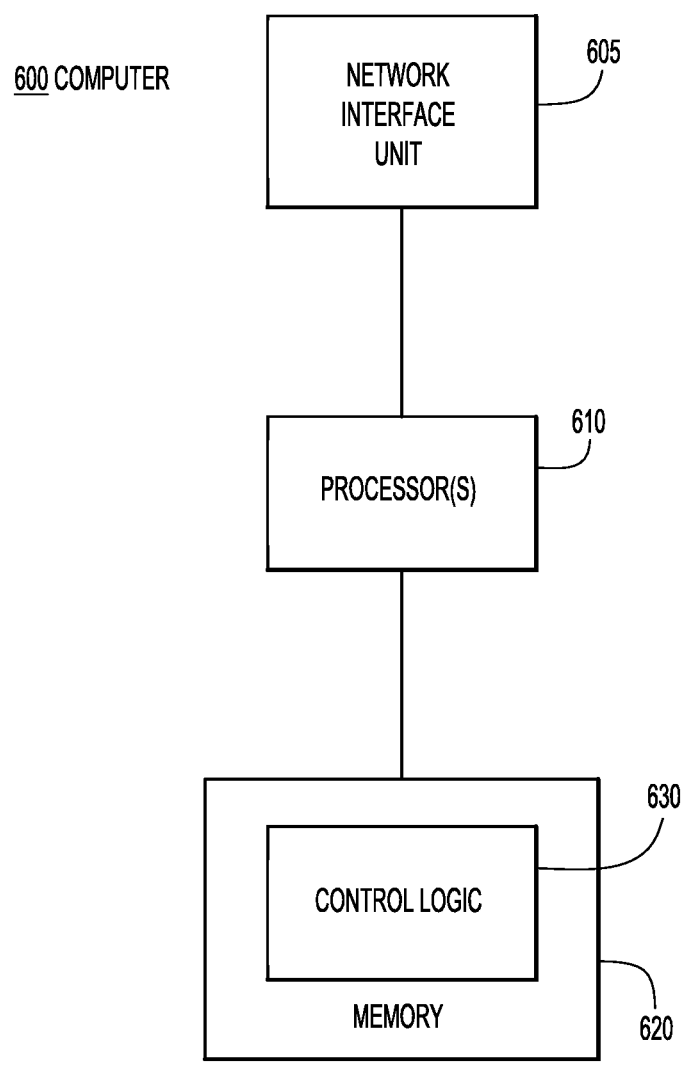
FIG. 6 is a block diagram of an example computer or controller to implement the aggregate interference model as embodied in the methods of FIGS. 4 and 5.

With reference to FIG. 6, there is a block diagram of an example computer or controller 600 to perform the methods described above. Computer 600 includes an interface unit 605 configured to receive and send data from and to a user and/or communication network. Computer 600 includes one or more processors 610 that execute software stored in memory 620. The processor(s) 610 is/(are) for example, a microprocessor or microcontroller. To this end, the memory 620 stores instructions for control logic 630. When the one or more processors 610 execute control logic 630, processors 610 performs the operations described herein to implement the aggregate interference model, including the operations described in connection with methods 400 and 500.

Memory 620 may comprise read only memory (ROM), random access memory (RAM), magnetic disk storage media devices, optical storage media devices, flash memory devices, electrical, optical, or other physical/tangible memory storage devices. Thus, in general, the memory 620 may comprise one or more tangible (non-transitory) computer readable storage media (e.g., a memory device) encoded with software comprising computer executable instructions and when the software is executed (by the processor(s) 610) it is operable to perform the operations described herein.

Memory 620 also stores data used and generated by control logic 630, including data for EIRP and related parameters $L_p$, $G_r(\theta, \phi)$, $L_{pol}$, $L_s$ and FDR($\Delta f$) for each interferer k. The data also includes means, variances, sums of means and sums of variances (e.g., stored in Array A), a normal combined interference power distribution, an aggregate interference power distribution, and numerical convolution results.

An advantage of using the aggregate interference model in computer 600 is that the computer is able to aggregate many thousands of different modeled interference power distributions having wide dynamic ranges to produce an accurate aggregate interference power distribution in a relatively short amount of time and that is accurate relative to conventional techniques. In an example in which 1000 such power distributions are to be aggregated and in which 990 of the power distributions meet the CLT criterion, the 990 power distributions may be combined through simple additions of their means and variances, while only 10 of the distributions require computationally complex and time consuming convolutional combining. Thus, the aggregate interference model customizes the set of instructions that processors 610 execute so as to reduce the number of computations and thus the time required to perform the aggregation compared to conventional techniques.

As discussed above, the aggregate interference model embodied in methods 400 and 500 may also be used in an actual receiver to validate the performance of that receiver, as is now discussed in connection with FIGS. 7 and 8.

5. Receiver

Figure 7:
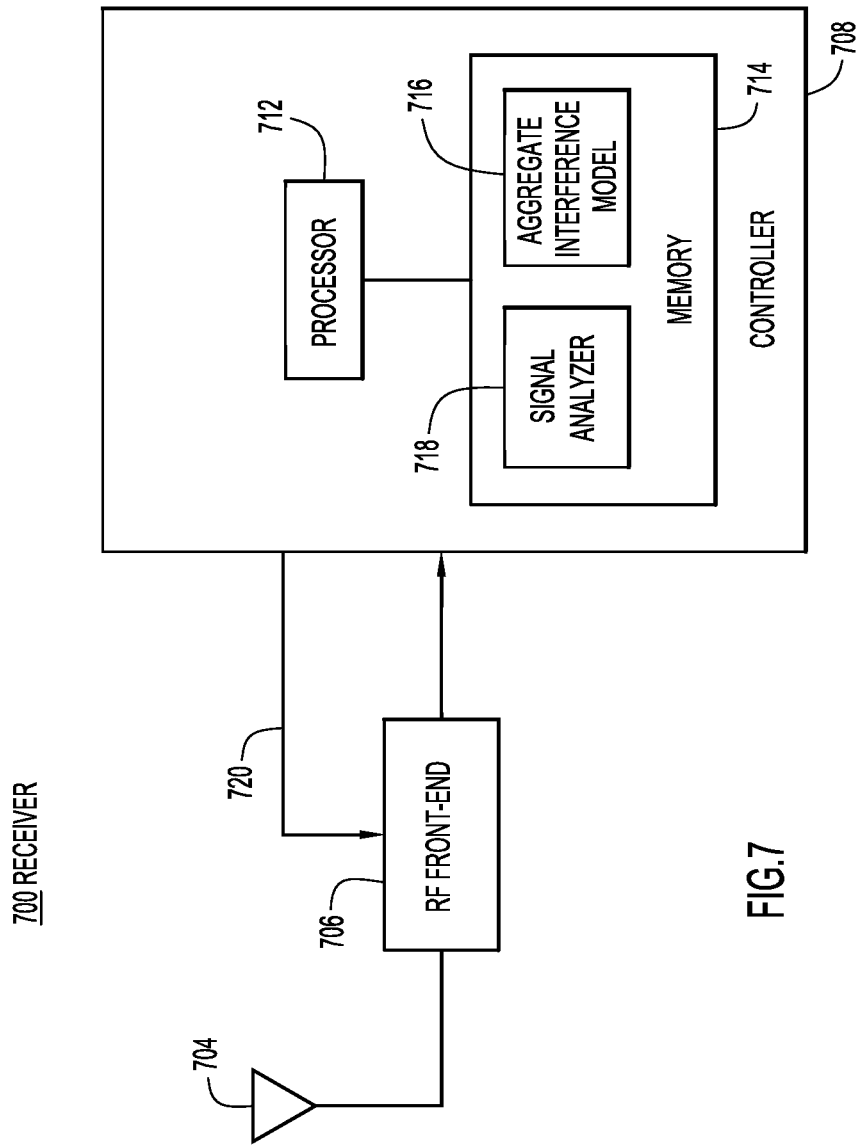
FIG. 7 is a block diagram of an actual physical receiver that implements the aggregate interference model to validate performance of the receiver with respect to actual signals/interference received by the receiver.

With reference to FIG. 7, there is a shown a block diagram of an actual physical receiver 700, corresponding to receiver 102 in FIG. 1 for example, that uses an instance of the aggregate interference model to validate performance of the receiver with respect to actual signals/interference received by the receiver. Receiver 700 may be part of a spectrum monitor that collects and analyzes signals from the environment. In another embodiment, receiver 700 may be a virtual receiver implemented as a computer program. Receiver 700 includes an antenna 704, an RF front-end 706, and a controller 708. Antenna 704 delivers to RF front-end 706 RF signals captured in a receive beam associated with the antenna. RF front-end 706 includes RF signal processing components such as a frequency down-converter, amplifiers, attenuators, and filters, and an analog-to-digital converter (ADC) (not specifically shown in FIG. 7) to convert the captured RF signals to a digitized baseband or near-baseband signal, and provides the digitized signal to controller 708.

Controller 708 includes a processor 712 to execute program modules stored in a memory 714, including an aggregate interference model 716 as described above, and a signal analyzer 718 that analyzes the digitized signal from RF front-end 706 to detect (RF) signals therein. Controller 708 also controls/configures the RF signal processing components of RF front-end 706 via control messages 720, for example, to frequency scan the environment for RF signals, and condition captured RF signals for improved reception, e.g., by adjusting parameters such as attenuation, frequency bandwidth, and amplifier gain.

6. Receiver Method

Figure 8:
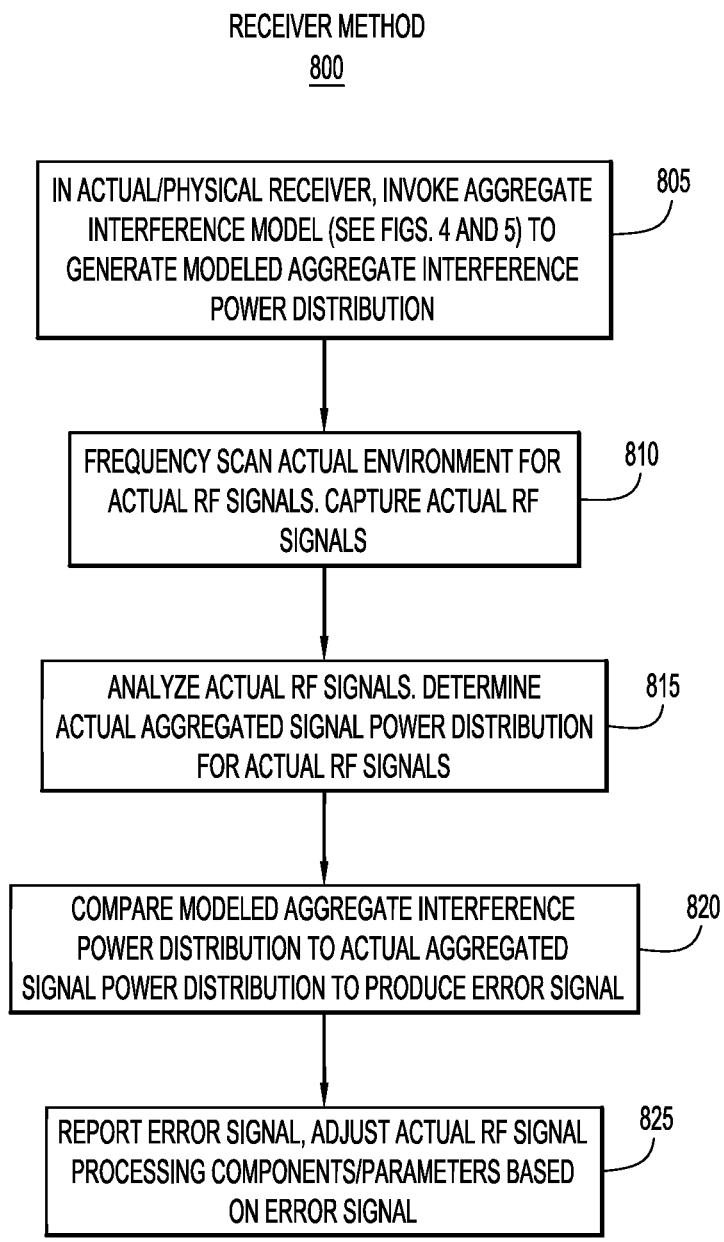
FIG. 8 is a flowchart of an example method of using the aggregate interference model in the receiver of FIG. 7 to verify performance of the receiver.

With reference to FIG. 8, there is a flowchart of an example method 800 of using aggregate interference model 716 in receiver 700 to verify performance of the receiver.

At 805, controller 708 of receiver 700 invokes aggregate interference model 716 (i.e., performs methods 400 and 500) to model interference and determine a modeled aggregate interference power distribution for the modeled interference.

At 810, controller 708 commands RF front-end 706 to scan the environment for actual RF signals and capture any signals therein.

At 815, controller 708 analyzes the captured signals in the digitized baseband signal from RF front-end 706. Controller 708 may determine an actual aggregate signal power distribution for all of the captured signals using any known technique to aggregate individual actual (received) signal power distributions into an actual aggregate signal power distributions.

At 820, controller 708 compares the modeled aggregate interference power distribution from 805 to the actual aggregate signal power distribution from 815 to generate an error signal indicative of differences between the compared distributions.

At 825, controller 708 may report the error signal via a display/monitor or other output device connected with receiver 700 (not shown in the figures). Also, controller 708 may adjust one or more RF signal processing parameters in RF front-end 706 based on results of the compare. For example, controller 708 may adjust (e.g., increase or decrease) an RF front-end filter bandwidth, attenuation, and/or amplifier gain to either increase or decrease the actual aggregate signal power distribution to match the modeled aggregate interference power distribution.

Method 800 repeats over time to periodically adjust the receiver parameters.

7. Summary

In summary, in one form, a computationally efficient computer implemented hybrid method of determining a modeled aggregate interference power distribution at a receiver resulting from multiple radio frequency (RF) interferers spaced from the receiver is provided. The computer implemented method comprises: determining a respective interference power distribution at the receiver for each interferer; determining, among the interference power distributions, (i) first interference power distributions that meet a Central Limit Theorem (CLT) criterion, and (ii) second interference power distributions that do not meet the CLT criterion; combining the first interference power distributions using the CLT to produce the normal combined interference power distribution; and convolving the second interference power distributions with each other and the normal combined interference power distribution to produce the aggregate interference power distribution.

In yet another form, a computer program product is provided. The computer program product includes non-transitory computer readable storage media encoded with instructions that, when executed by a processor, cause the processor to: determine a respective interference power distribution at the receiver for each interferer; determine, among the interference power distributions, (i) first interference power distributions that meet a Central Limit Theorem (CLT) criterion, and (ii) second interference power distributions that do not meet the CLT criterion; combine the first interference power distributions using the CLT to produce the normal combined interference power distribution; and convolve the second interference power distributions with each other and the normal combined interference power distribution to produce the aggregate interference power distribution.

In another form, an apparatus is provided comprising: an antenna; a radio frequency (RF) receiver coupled to the antenna; and a controller, coupled to the RF receiver, configured to implement a computer model to determine a modeled aggregate interference power distribution resulting from multiple interferers, wherein to implement the computer model the controller is configured to: determine a respective interference power distribution for each interferer; determine, among the interference power distributions, (i) first interference power distributions that meet a Central Limit Theorem (CLT) criterion, and (ii) second interference power distributions that do not meet the CLT criterion; combine the first interference power distributions using the CLT to produce the normal combined interference power distribution; and convolve the second interference power distributions with each other and the normal combined interference power distribution to produce the modeled aggregate interference power distribution.

The above description is intended by way of example only.

What is claimed is:

1. A computationally efficient computer implemented hybrid method of determining a modeled aggregate interference power distribution at a receiver resulting from multiple radio frequency (RF) interferers spaced from the receiver, comprising:
   determining a respective interference power distribution at the receiver for each interferer;
   determining, among the interference power distributions, (i) first interference power distributions that meet a Central Limit Theorem (CLT) criterion, and (ii) second interference power distributions that do not meet the CLT criterion;
   combining the first interference power distributions using the CLT to produce a normal combined interference power distribution; and
   convolving the second interference power distributions with each other and the normal combined interference power distribution to produce the aggregate interference power distribution.

2. The method of claim 1, further comprising:
   determining a variance of each interference power distribution,
   wherein the determining the first interference power distributions includes determining the first interference power distributions such that no one of the first interference power distributions has a variance that is greater than or equal to a predetermined fraction of a sum of the variances of the first interference power distributions.

3. The method of claim 2, wherein the predetermined fraction is substantially less than 1.

4. The method of claim 1, further comprising:
   determining a mean and a variance of each of the multiple interference power distributions,
   wherein the combining the first interference power distributions includes summing the means of the first interference power distributions into a combined mean and summing the variances of the first interference power distributions into a combined variance such that the combined mean and the combined variance together define the normal combined interference power distribution according to the CLT.

5. The method of claim 4, further comprising:
   generating samples of the normal combined interference power distribution based on the combined mean and the combined variance thereof,
   wherein the convolving the second interference power distributions with each other and the normal combined interference power distribution includes numerically convolving the second interference power distributions with each other and the samples of the normal combined interference power distribution.

6. The method of claim 4, further comprising:
   summing the variances of the multiple interference power distributions to produce a total variance;
   if a greatest variance among the variances is greater than or equal to a predetermined fraction of the total variance, subtracting the greatest variance from the total variance to produce a reduced total variance that represents a summation of variances remaining after the subtracting; and
   repeating the subtracting using the reduced total variance in place of the total variance until a next greatest variance among the variances remaining is no longer greater than or equal to the predetermined fraction of the reduced total variance, wherein the variances remaining after the repeating correspond to the variances of the first interference power distributions and the variances subtracted after the repeating correspond to the variances of the second interference power distributions, respectively.

7. The method of claim 6, further comprising:
   summing the means to produce a total mean, wherein:
   the subtracting includes subtracting the mean corresponding to the greatest variance from the total mean to produce a reduced total mean that represents a summation of means remaining after the subtracting; and
   the repeating includes repeating the subtracting of the mean corresponding to the next greatest variance, wherein the means remaining after the repeating correspond to the means of the first interference power distributions and the means subtracted after the repeating correspond to the means of the second interference power distributions, respectively.

8. The method of claim 1, wherein the determining the interference power distribution at the receiver for each interferer includes, for each interferer:
   assigning an effective isotropically radiated power (EIRP) to the interferer; and
   scaling the EIRP by one or more factors to produce the interference power distribution at the receiver, wherein the one or more factors include: a signal propagation path loss between the interferer and the receiver; an antenna gain of the receiver in a direction of the interferer; frequency dependent rejection at the receiver based on a center frequency emitted by the interferer; and an antenna polarization mismatch between an antenna at the interferer and an antenna the receiver.

9. A non-transitory computer readable storage media encoded with instructions that, when executed by a processor, cause the processor to perform a set of computationally efficient computer implemented hybrid operations to determine a modeled aggregate interference power distribution at a receiver resulting from multiple radio frequency (RF) interferers spaced from the receiver, wherein the instructions cause the processor to:
  determine a respective interference power distribution at the receiver for each interferer;
  determine, among the interference power distributions, (i) first interference power distributions that meet a Central Limit Theorem (CLT) criterion, and (ii) second interference power distributions that do not meet the CLT criterion;
  combine the first interference power distributions using the CLT to produce a normal combined interference power distribution; and
  convolve the second interference power distributions with each other and the normal combined interference power distribution to produce the aggregate interference power distribution.

10. The computer readable storage media of claim 9, further including instructions to cause the processor to:
  determine a variance of each interference power distribution,
  wherein the instruction to cause the processor to determine the first interference power distributions include instructions to cause the processor to determine the first interference power distributions such that no one of the first interference power distributions has a variance that is greater than or equal to a predetermined fraction of a sum of the variances of the first interference power distributions.

11. The computer readable storage media of claim 10, wherein the predetermined fraction is substantially less than 1.

12. The computer readable storage media of claim 9, further including instructions to cause the processor to:
  determine a mean and a variance of each of the multiple interference power distributions,
  wherein the instructions to cause the processor to combine the first interference power distributions includes instructions to cause the processor to sum the means of the first interference power distributions into a combined mean and summing the variances of the first interference power distributions into a combined variance such that the combined mean and the combined variance together define the normal combined interference power distribution according to the CLT.

13. The computer readable storage media of claim 12, further including instructions to cause the processor to:
  generate samples of the normal combined interference power distribution based on the combined mean and the combined variance thereof,
  wherein the instructions to cause the processor to convolve the second interference power distributions with each other and the normal combined interference power distribution include instructions to cause the processor to numerically convolve the second interference power distributions with each other and the samples of the normal combined interference power distribution.

14. The computer readable storage media of claim 12, further including instructions to cause the processor to:
  sum the variances of the multiple interference power distributions to produce a total variance;
  if a greatest variance among the variances is greater than or equal to a predetermined fraction of the total variance, subtract the greatest variance from the total variance to produce a reduced total variance that represents a summation of variances remaining after the subtract operation; and
  repeating the subtract operation using the reduced total variance in place of the total variance until a next greatest variance among the variances remaining is no longer greater than or equal to the predetermined fraction of the reduced total variance, wherein the variances remaining after the repeating correspond to the variances of the first interference power distributions and the variances subtracted after the repeating correspond to the variances of the second interference power distributions, respectively.

15. The computer readable storage media of claim 14, further including instructions to cause the processor to:
  sum the means to produce a total mean, wherein:
  the instructions to cause the processor to subtract include instructions to cause the processor to subtract the mean corresponding to the greatest variance from the total mean to produce a reduced total mean that represents a summation of means remaining after the subtracting; and
  the instructions to cause the processor to repeat include instructions to cause the processor to repeat the subtract of the mean corresponding to the next greatest variance, wherein the means remaining after the repeating correspond to the means of the first interference power distributions and the means subtracted after the repeating correspond to the means of the second interference power distributions, respectively.

16. An apparatus comprising:
  an antenna;
  a radio frequency (RF) receiver coupled to the antenna; and
  a controller, coupled to the RF receiver, configured to implement a computer model to determine a modeled aggregate interference power distribution resulting from multiple interferers, wherein to implement the computer model the controller is configured to:
  determine a respective interference power distribution for each interferer;
  determine, among the interference power distributions, (i) first interference power distributions that meet a Central Limit Theorem (CLT) criterion, and (ii) second interference power distributions that do not meet the CLT criterion;
  combine the first interference power distributions using the CLT to produce a normal combined interference power distribution; and
  convolve the second interference power distributions with each other and the normal combined interference power distribution to produce the modeled aggregate interference power distribution.

17. The apparatus of claim 16, wherein the controller is further configured to:
  receive signals indicative of actual RF signals captured by the antenna;
  determine an actual aggregate signal power distribution of the actual RF signals;

compare the actual aggregate signal power distribution to the modeled aggregated interference power distribution; and adjust signal processing parameters in the RF receiver responsive to results of the compare.

18. The apparatus of claim 16, wherein to implement the computer model the controller is further configured to:

determine a variance of each interference power distribution, wherein the controller is configured to determine the first interference power distributions such that no one of the first interference power distributions has a variance that is greater than or equal to a predetermined fraction of a sum of the variances of the first interference power distributions.

19. The apparatus of claim 16, wherein to implement the computer model the controller is configured to:

determine a mean and a variance of each of the multiple interference power distributions, wherein the controller is configured to combine the first interference power distributions by summing the means of the first interference power distributions into a combined mean and summing the variances of the first interference power distributions into a combined variance such that the combined mean and the combined variance together define the normal combined interference power distribution according to the CLT.

20. The apparatus of claim 19, wherein to implement the computer model the controller is configured to:

generate samples of the normal combined interference power distribution based on the combined mean and the combined variance thereof, wherein the controller is configured to convolve by numerically convolving the second interference power distributions with each other and the samples of the normal combined interference power distribution.

21. The apparatus of claim 19, wherein to implement the computer model the controller is configured to:

sum the variances of the multiple interference power distributions to produce a total variance;

if a greatest variance among the variances is greater than or equal to a predetermined fraction of the total variance, subtract the greatest variance from the total variance to produce a reduced total variance that represents a summation of variances remaining after the subtracting; and repeat the subtract operation using the reduced total variance in place of the total variance until a next greatest variance among the variances remaining is no longer greater than or equal to the predetermined fraction of the reduced total variance, wherein the variances remaining after the repeating correspond to the variances of the first interference power distributions and the variances subtracted after the repeating correspond to the variances of the second interference power distributions, respectively.

22. The apparatus of claim 16, wherein the controller is configured to determine the interference power distribution at the receiver for each interferer by, for each interferer:

assigning an effective isotropically radiated power (EIRP) to the interferer; and scaling the EIRP by one or more factors to produce the interference power distribution at the receiver, wherein the one or more factors include: a signal propagation path loss between the interferer and the receiver; an antenna gain of the receiver in a direction of the interferer; frequency dependent rejection at the receiver based on a center frequency emitted by the interferer; and an antenna polarization mismatch between an antenna at the interferer and an antenna the receiver.

* * * * *